United States Patent

Furutsu

[11] Patent Number: 5,278,935
[45] Date of Patent: Jan. 11, 1994

[54] DEVICE FOR CONTROLLING MOVING BODY PARTICIPATING IN PHOTOGRAPHING OPERATION

[75] Inventor: Etsuro Furutsu, Kanagawa, Japan

[73] Assignee: Canon Kabushiki Kaisha, Tokyo, Japan

[21] Appl. No.: 859,248

[22] Filed: Mar. 26, 1992

Related U.S. Application Data

[63] Continuation of Ser. No. 261,265, Oct. 24, 1988, abandoned.

[30] Foreign Application Priority Data

Oct. 30, 1987 [JP] Japan .................... 62-275254

[51] Int. Cl.$^5$ .................................. H02D 5/165
[52] U.S. Cl. ........................... 388/812; 388/907.5; 388/912; 318/603; 318/606
[58] Field of Search ................. 318/600–608; 318/640, 569, 590; 388/828, 829, 904, 809–815; 388/907.5; 388/912

[56] References Cited

U.S. PATENT DOCUMENTS

| | | | |
|---|---|---|---|
| 4,368,412 | 1/1983 | Inoue | 318/603 X |
| 4,404,505 | 9/1983 | Swanson et al. | 318/603 X |
| 4,429,267 | 1/1984 | Veale | 318/603 X |
| 4,439,825 | 3/1984 | Donner | 318/603 X |
| 4,441,059 | 4/1984 | Watanabe | 318/603 X |
| 4,472,040 | 9/1984 | Kawabata et al. | 354/406 |
| 4,484,099 | 11/1984 | Kawai | 310/317 |
| 4,504,760 | 3/1985 | Yamamoto et al. | 310/323 |
| 4,560,263 | 12/1985 | Katsuma et al. | 354/195.1 |
| 4,563,625 | 1/1986 | Kornbrekke et al. | 318/603 |
| 4,563,625 | 1/1986 | Kornbrekke et al. | 318/603 |
| 4,613,225 | 9/1986 | Kawabata et al. | 354/403 |
| 4,658,172 | 4/1987 | Izukawa et al. | 310/316 |
| 4,660,933 | 4/1987 | Notagashira et al. | 350/255 |
| 4,678,956 | 7/1987 | Izukawa et al. | 310/323 |
| 4,681,419 | 7/1987 | Sakai et al. | 354/402 |
| 4,687,915 | 8/1987 | Sakai et al. | 250/201 |
| 4,692,672 | 9/1987 | Okuno et al. | 318/116 |
| 4,713,571 | 12/1987 | Suzuki et al. | 310/316 |
| 4,749,896 | 6/1988 | Suzuki et al. | 310/316 |

*Primary Examiner*—William M. Shoop, Jr.
*Assistant Examiner*—David Martin
*Attorney, Agent, or Firm*—Fitzpatrick Cella, Harper & Scinto

[57] ABSTRACT

A control device for a moving body such as a focusing lens or the like is arranged to vary time intervals at which a speed control action is performed on a motor according to a driving amount required for moving the moving body to a target position by means of the motor. The arrangement enables the device to prevent an adverse effect of vibrations, etc. and to accurately accomplish position control.

9 Claims, 4 Drawing Sheets

DEVICE FOR CONTROLLING MOVING BODY PARTICIPATING IN PHOTOGRAPHING OPERATION

This application is a continuation of application Ser. No. 07/261,265 filed Oct. 24, 1988, now abandoned.

BACKGROUND OF THE INVENTION

1. Field of the Invention

This invention relates to a device for driving a moving body to a given position with a motor and more particularly to a device suited for driving a lens to a given position in adjusting the focus of a camera.

2. Description of the Related Art

A DC motor is often employed for lens driving in an automatic focusing device which is provided within a camera for automatic focal length adjustment. For this purpose, the motor is arranged to give a high degree of torque by means of a reduction gear despite of the compact size thereof. Meanwhile, a vibratory-wave motor which is capable of giving a high torque without recourse to a reduction gear and has a high degree of responsivity has recently appeared to be used for driving a focusing lens in place of the DC motor.

A servo device such as the above stated lens driving device for focus adjustment is generally arranged to perform closed loop control on the basis of information fed back by using an electronic control device of the kind using a computer (hereinafter may be called a microcomputer). Therefore, the lens driving device is arranged to detect a change in the rotating speed of a motor-driven lens system, etc.; to have a detected degree of control fed back to be reflected upon a change in a voltage applied to the motor. Meanwhile, the device using the vibratory-wave motor is generally arranged to have the detected degree of control fed back to be reflected upon a change in the frequency of a power supply to the motor.

In case where the driving control over the lens system of a camera is to be changed by an electronic control device using a microcomputer, the degree of the change is determined in the designing state according to the kind, required performance, etc. of the camera. Generally, however, the device is designed to permit selection of rotational frequency (rotation speed) from among 16 to 128 steps of values.

The lens driving device such as the above stated automatic focusing device or the like is to be used for forming the image of a photographing object on a film surface (or on a CCD or the like) in a focused state during a photo taking operation. Therefore, the device is not only required to permit accurate focusing for a sharp picture but also is preferably arranged to permit the photo taking operation to be carried out without being affected by any vibrations.

In the case of the above stated lens system driving device using a DC motor, the actual rotational frequency of the motor does not change immediately upon the instructions of the microcomputer for changes in the rotational frequency so that the driving control can be smoothly accomplished. On the other hand, however, the performance of the driving device of this kind is inferior in accurately bringing the lens system to a stop in a given position.

Meanwhile, the lens driving device of the kind using the above stated vibratory-wave motor is advantageous in that the device has a relatively easy operability for rotation speed control and yet has a high degree of responsivity to speed control. While the device has the advantage of, for example, accurately stopping the lens system in a given position by virtue of its high degree of responsivity to the instruction of the microcomputer for changing the rotational frequency of the motor, a disadvantage of the device lies in that: The high degree of responsivity tends to bring about vibrations as a result of its rapid response to the instructions of the microcomputer to change the rotational frequency. The lens driving device of this kind, therefore, presents a problem in driving control for a smooth change in the rotation speed.

The problem of the lens system driving device using the vibratory-wave motor becomes more pronsonced in case where a power-focusing lens system driving device is arranged in combination with the above stated automatic focusing device. Since this device has the high degree of responsivity and is advantageous as a driving device of a camera for focus adjustment or the like, a solution of this problem is highly desirable.

SUMMARY OF THE INVENTION

An object of this invention is to provide a driving device arranged to determine a number of times for which a motor speed adjusting action is to be performed according to a distance to a given position in driving a moving body to the given position with a motor; and to have driving control smoothly and accurately performed over the moving body.

Under the above stated object of the invention, the driving device is arranged to smoothly drive the moving body by less frequently performing the above stated speed adjusting action accordingly as the distance to the given position increases.

Another object of the invention is to provide a lens system driving device wherein an operation characteristic resulting from the high degree of responsivity of a vibratory-wave motor used for driving the lens system is substantially modified to meet the requirement for accurate positioning control and smooth driving control without any vibrations that otherwise tends to be caused by the use of the vibratory-wave motor.

Under that object, a lens system driving device which embodies one aspect of this invention and is provided with a vibratory-wave motor for driving and shifting a lens system in the direction of the optical axis thereof and also with an electronic control device for driving and controlling the vibratory-wave motor in shifting the lens system to a set target position thereof is arranged as follows: The above stated electronic control device comprises a first control circuit which sets the moving speed of the lens system; a second control circuit which is arranged to cause the moving speed of the lens system to intermittently follow the changes of the set lens system moving speed; detecting means for serially detecting the remainder of a lens system driving amount until the lens system reaches the above stated target position at every minute length of time; and interval adjusting means for adjusting the length of time intervals of the intermittent change following action of the vibratory-wave motor according to detection information obtained from the remaining driving amount detecting means. The interval adjusting means is arranged to make the intervals of the change following action longer when the remainder of the lens system driving amount is large and shorter when the remainder is small.

A lens system driving device embodying another aspect of the invention under the above stated object is arranged to accurately accomplish position control over the lens system by lessening the frequency of the lens driving speed adjusting action to prevent vibrations from occurring as a result of changes in the lens driving speed when the lens driving target position is at a far distance and by increasing the frequency of the lens driving speed adjusting action to increase the accuracy of the position control when the lens system comes closer to the target position.

The above and other objects and features of the invention will become apparent from the following detailed description of an embodiment thereof taken in conjunction with the accompanying drawings.

DETAILED DESCRIPTION OF THE PREFERRED EMBODIMENT

Figure 1:
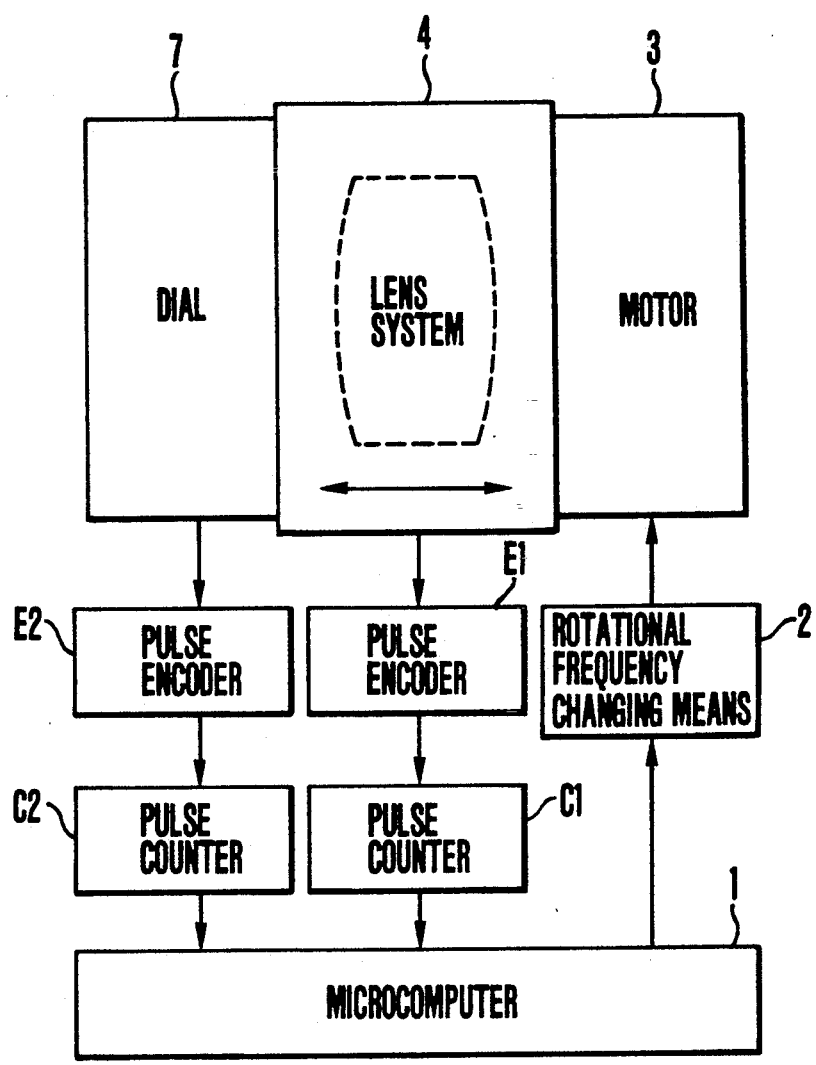
FIG. 1 is a block diagram showing in outline the hardware arrangement of a lens system driving device which uses a vibratory-wave motor and is arranged as an embodiment of this invention.

This invention is further described below through an embodiment thereof shown in the drawings:

FIG. 1 shows in a block diagram the hardware arrangement of a focusing lens system driving device embodying this invention. The illustration includes a microcomputer 1 which is employed as a part of an electronic control device. A known lens system 4 is arranged to be shiftable in the direction of its optical axis for focus adjustment. The microcomputer 1 is provided with a preset program for shifting the lens system 4 in accordance with either measured distance information from a distance measuring device which is not shown (see, for example, U.S. Pat. Nos. 4,681,419 and 4,472,040) or the input information of a power focusing mechanism. The output signal of the microcomputer 1 is supplied to rotational frequency changing means 2. The changing means 2 then produces and supplies to a vibratory-wave motor 3 a signal of a predetermined frequency. Then lens system 4 is driven and controlled through the vibratory-wave motor 3.

A pulse encoder E1 is arranged to generate a pulse signal in proportion to the lens system driving amount of the vibratory-wave motor 3. The pulses generated by the pulse encoder E1 is counted by a pulse counter C1. In addition to an automatic focusing mechanism which obtains, by means of a distance measuring device (not shown), information on the shifted position of the lens system 4, the camera of this embodiment is provided with a power focusing arrangement for driving the lens system 4 by means of the vibratory-wave motor 3 on the basis of a lens system driving signal which is manually set as desired by the operator of the camera. In FIG. 1, a reference numeral 7 denotes a dial which is provided for receiving the lens system driving signal.

The dial 7 is arranged to have the lens system 4 driven to an extent proportional to the turning degree of a rotary knob provided thereon. A pulse encoder E2 is arranged to generate pulses in proportion to the turning degree of the dial 7 when the dial 7 is operated. A pulse counter C2 is arranged to count the pulses generated by the pulse encoder E2.

The lens system driving device arranged as the embodiment of the invention as described above operates as follows: When the microcomputer 1 receives either a measured distance information signal from the distance measuring device of the automatic focusing mechanism which is not shown or a position information signal formed by an operation performed on the dial 7 which is the input means of the power focusing arrangement, the microcomputer 1 determines the lens system driving speed, a target position to which the lens system 4 is to be shifted, a control mode to be employed, etc. Then the vibratory-wave motor 3 is driven and controlled in accordance with programmed procedures which have been set within the microcomputer 1.

Figure 5:
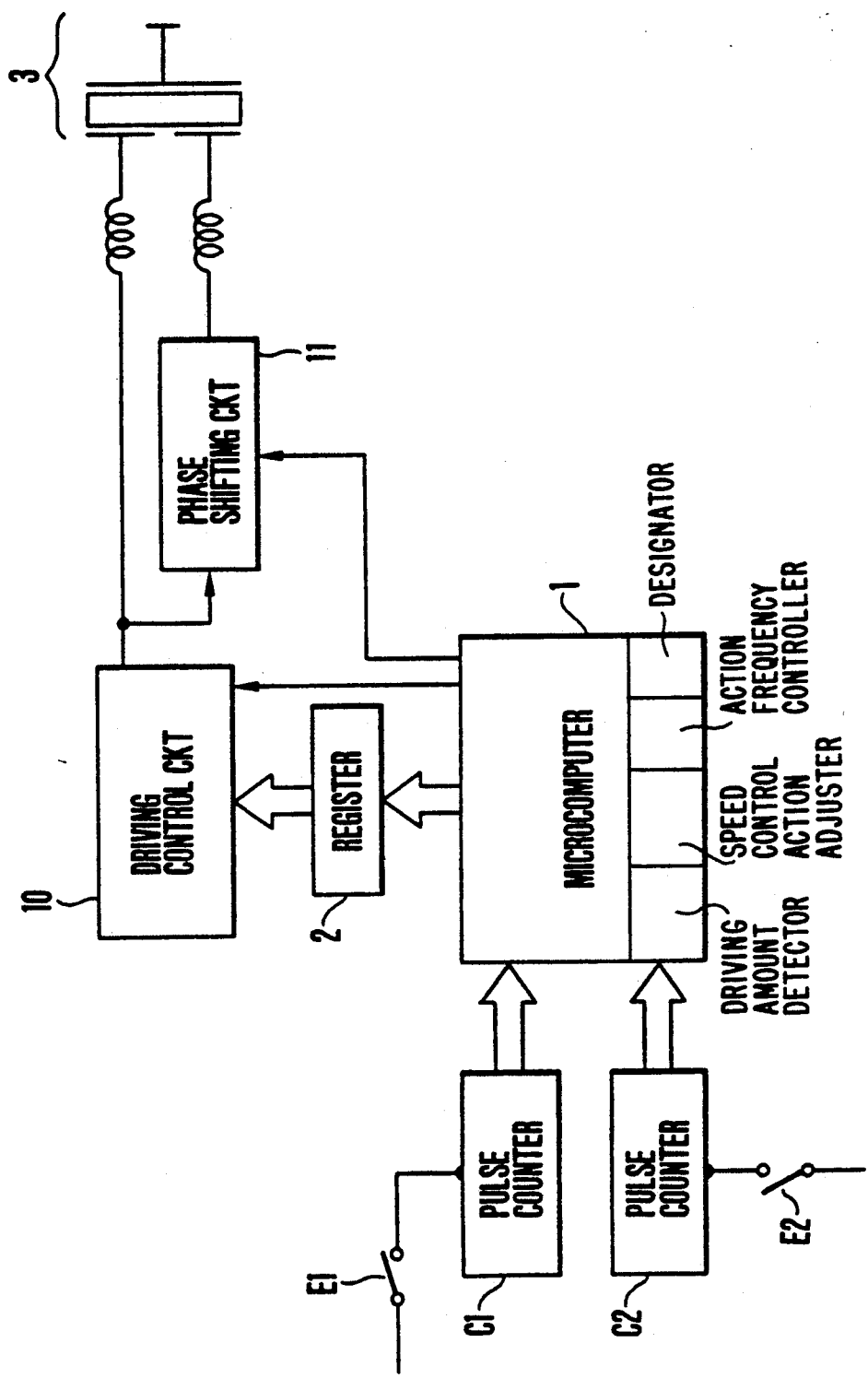
FIG. 5 is a circuit diagram showing in details the arrangement of the driving device of FIG. 1.

FIG. 5 more specifically shows the arrangement of the driving device of FIG. 1. In the drawing, the same component parts as those of FIG. 1 are indicate by the same reference numerals. As shown in FIG. 5, microcomputer 1 includes a driving amount detector, a speed control action adjuster, an action frequency controller and a designator. As will be readily apparent to those skilled in the art, the circuit controls the driving speed of the motor. The speed control action adjuster shortens the interval at which speed control action is performed by the circuit as the moving body comes closer to a target moving position thereof. Specifically, the speed control circuit may be arranged to lower the driving speed of the motor as the moving body comes closer to the target moving position. In a photo taking operation, the driving amount detector may be arranged to detect the driving amount required for moving the moving body to the target moving position, with the speed control circuit controlling the driving speed of the motor, which may be adjusted to a target speed. The action frequency controller controls the number of times which the speed control circuit acts per unit time in accordance with the driving amount detected by the driving amount detector, and increases the number of counts per unit time as the driving amount decreases. The designator is arranged to render the speed control circuit operative at each given timing, and a setting circuit may be arranged to set the timing intervals at a greater interval as the moving body is located at a greater distance from the target moving position. Referring to FIG. 5, a switch E1 which serves as a pulse encoder is arranged to turn on and off in response to the operation of the lens system driving mechanism of FIG. 1 and to produce a number of pulses in proportion to the driven amount of the lens system 4. The pulses from the encoder switch E1 are counted by the counter C1. A switch E2 which serves also as a pulse encoder is arranged to turn on and off in response to the turning operation of the dial 7 and to produce a number of pulses according to the rotation of the dial 7. The pulses produced from the encoder switch E2 are counted by the counter C2. A microcomputer 1, including a driving amount detector, a speed control action adjuster, an action frequency controller and a designator, is the same as the one shown in FIG. 1. The microcomputer 1 receives information on the contents of the counters C1 and C2 and is arranged to transmit a frequency value to a register 2 which is arranged to serve as rotational frequency changing means in a manner as will be described later. A driving control circuit 10 is arranged to control the driving operation of the vibratory-wave motor 3. The control circuit 10 includes an oscillation circuit which is arranged to oscillate at a frequency corresponding to the frequency value supplied to the register 2. A phase shifting circuit 11 is arranged to shift the phase of a frequency signal from the control circuit 10 by a degree of + or −90 degrees. A known vibratory-wave motor 3 which has been disclosed, for example, in U.S. Pat. No. 4,504,760 is employed. The motor 3 is arranged to form a progressive vibratory wave by applying frequency signals of different phases respectively to first and second groups of piezoelectric or electrostrictive elements which are disposed in different positions on a vibrator; and to drive a rotor with this vibratory wave. The frequency signal which is phase shifted by the phase shifting circuit 11 and the frequency signal from the driving control circuit 10 are used as the above stated frequency signals of different phases. The phase shifting circuit 11 shifts the frequency signal phase + or −90 degrees in accordance with an instruction given from the microcomputer 1. Then, the rotating direction of the motor 3 is changed from one direction over to the other accordingly. With the motor 3 thus rotated, the lens driving mechanism is driven to shift the position of the lens system 4.

The lens driving device which is arranged as described in the foregoing performs a control operation, for example, according to a program which is set within the microcomputer 1 to match the power focusing mechanism.

Figure 2:
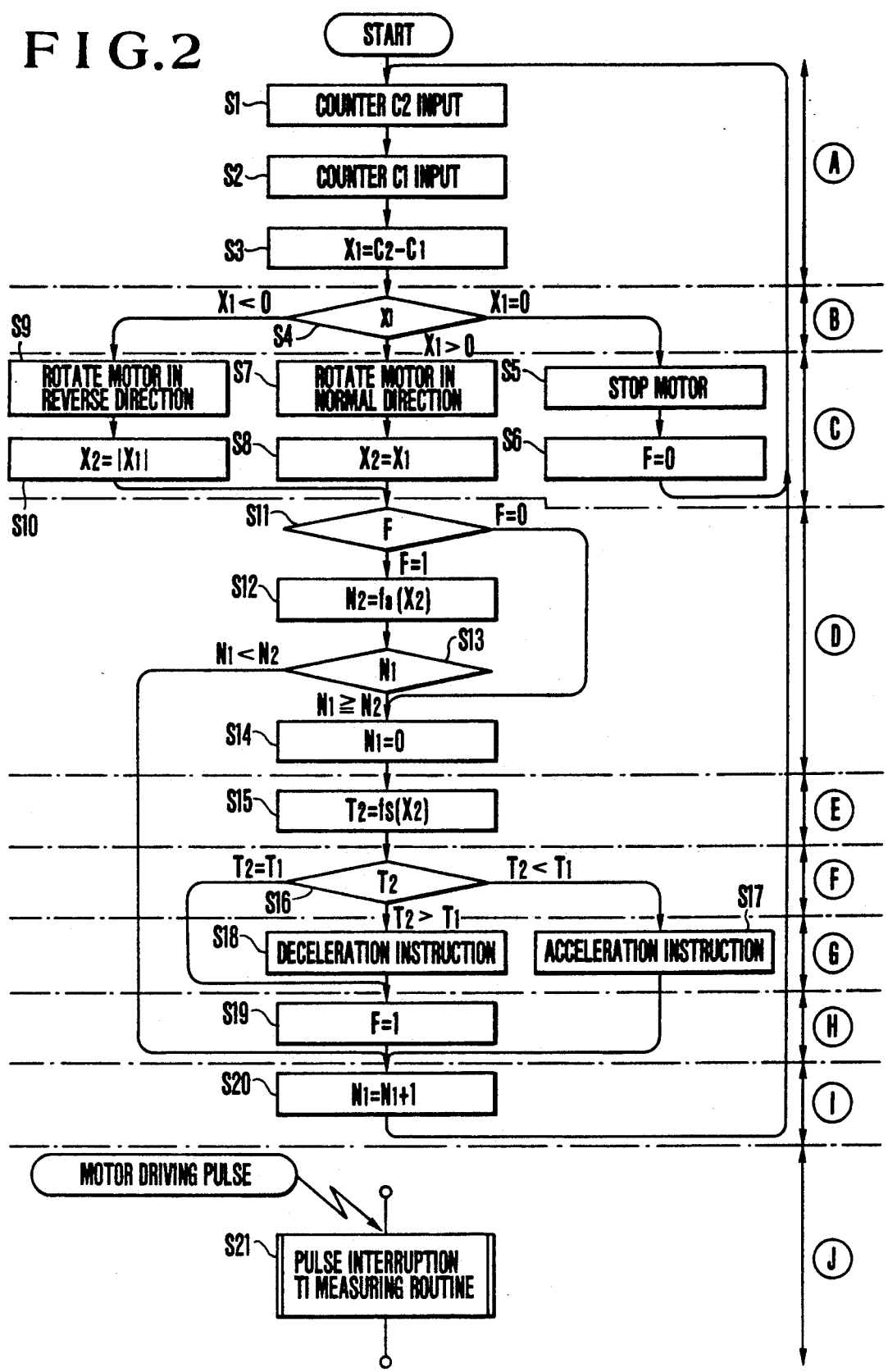
FIG. 2 is a flow chart showing by way of example the driving control performed by the same embodiment.

FIG. 2 is a flow chart showing the contents of the above stated program. The flow chart consists of discrete routines (A) to (J). The result of control over the length of intervals of instructions given for changing rotational frequency can be regarded, in a broad sense, as variations of the responsivity of the vibratory-wave motor 3. Therefore, in the following description, the control over the length of the above stated intervals of instructions are expressed as responsivity control.

The operation in each routine is as follows and the steps from the start of the flow and the stopping action on the vibratory-wave motor 3 are arranged to be repeatedly executed:

(A) Pulse Input Routine: At a step S1, information on the lens system shifting target position is obtained with the dial 7 turned and operated. The target position information is taken into the microcomputer 1 as a count signal from the pulse counter C2 which is in combination with the dial 7. Step S2: Information on the driven state of the lens system 4 is taken into the microcomputer 1 as a count signal from the pulse counter C1. Step S3: Using a difference between these count signals, a driving amount X1 which is necessary for shifting the lens system 4 to the target position (hereinafter referred to as the remaining relative driving amount X1) is computed.

The device may be arranged to have the lens system 4 begin to be driven the instant an input operation on the dial 7 begins; and thus to have the lens system 4 driven in parallel with the input operation. The device also may be arranged to have the lens system 4 begin to be driven after completion of the input operation on the dial 7. In the latter case, the lens system 4 is driven in the same manner as in the case where the lens system 4 is driven on the basis of the distance information from a distance measuring device for automatic focusing.

(B) Remaining Driving Amount Comparing, Branching Routine: At a step S4, the driving mode of the vibratory-wave motor 3 is determined on the basis of the remaining relative driving amount X1 for the lens system 4 computed by the above stated pulse input routine (A). Then, the flow of operation is allowed to branch off to the processing routine of the applicable mode.

For example, if the above stated remaining relative driving amount X1 is zero, the flow is branched out to a motor stopping routine, which consists of steps S5 and S6. If the remaining relative driving amount X1 is of a positive value larger than zero, the flow is branched out to a normal motor rotation routine which consists of steps S7 and S8. If the remaining relative driving amount X1 is of a negative value and smaller than zero, the flow is branched out to a reverse motor rotation routine which consists of steps S9 and S10. In the reverse motor rotation routine, the absolute value of the remaining relative driving amount X1 is obtained. This routine (B) detects the remainder of the lens system driving amount.

(C1) Motor Stopping Routine (Steps S5 and S6): A driving signal is produced to bring the vibratory-wave motor 3 to a stop, because: This branched routine is executed when the lens system 4 is already in the given target position and the focusing control is no longer required. The flow returns to its initial state. Further, at a step S6, a responsivity flag F is set at zero (a mode of having no control on the responsivity).

(C2) Normal Motor Rotation Routine (Steps S7 and S8): The rotating direction of the vibratory-wave motor 3 is set to be in the direction of normal rotation. A normal rotation driving signal is supplied to the vibratory-wave motor 3. The remaining relative driving amount X1 obtained by the pulse input routine (A) is substituted as it is for a remaining absolute driving amount X2.

(C3) Reverse Motor Rotation Routine (Steps S7, S10): The rotation of the vibratory-wave motor 3 is set to be in the reverse rotating direction. A reverse rotation driving signal is supplied to the motor 3. Further, the remaining relative driving amount X1 is substituted for the remaining absolute driving amount X2 by reversing the positive or negative sign thereof.

(D) Responsivity Changing Routine: The responsivity of the vibratory-wave motor 3 is changed according to the value of the remaining absolute driving amount X2. In other words, the responsivity is substantially lowered by increasing the interval length of the follow-up control over the vibratory-wave motor 3 when the value of the remaining absolute driving amount X2 is large and is substantially raised by more frequently performing the follow-up control over the vibratory-wave motor 3 when the value of the remaining absolute driving amount X2 is small.

Figure 3:
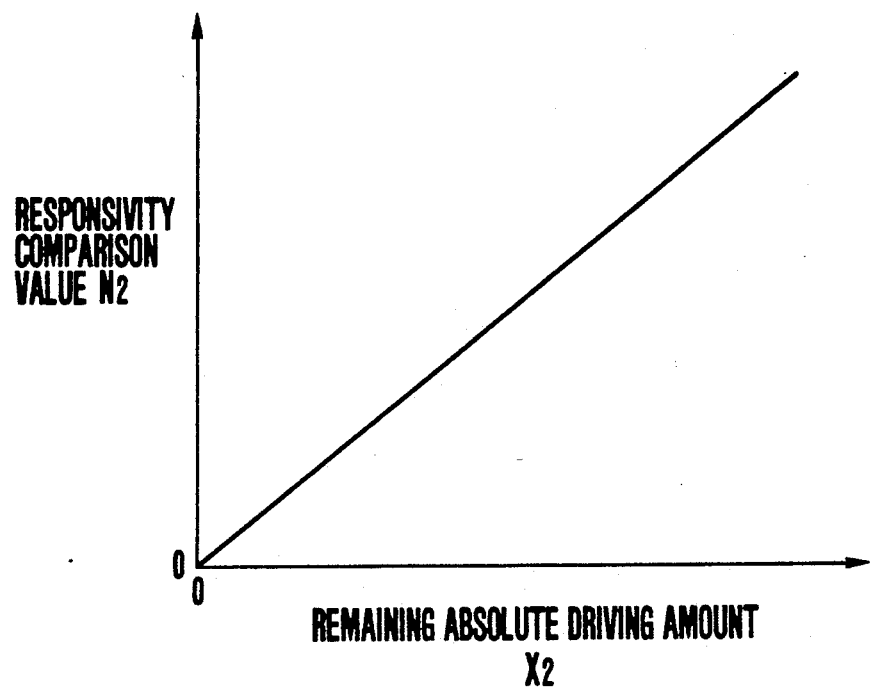
FIG. 3 is a chart showing the remainder of an absolute driving amount in relation to the comparison value of responsivity.

More specifically, in the normal and reverse motor rotation routines (C2) and (C3), the responsivity flag F is checked at a step 11. In the case of F=0 which indicates a mode of having no responsivity control, the motor 3 is considered to be in the process of building up and the flow is allowed to branch off to an acceleration or deceleration control routine. In the event of F=1, the flow comes to a step S12. At the step S12: A responsivity comparison value N2 is obtained as a function, fa, of the remaining absolute driving amount X2 that is, N2=fa(X2). Referring to FIG. 3, the function $N2=fa(X2)$ is shown as a proportionality relationship to the remaining amount X2 ($N2=fa(X2)\alpha X2$). The function fa(X2) thus increases in proportion to a necessary shifting degree for the target position.

At a step S13: The above stated responsivity comparison value N2 is compared with the counted value of a responsivity counter N1. If the value of the counter N1 is found to be equal to or larger than the value N2, the flow comes to a step S14. At the step S14: The counter N1 is cleared. The flow then branches off to a target pulse interval computing routine (E) which is to be executed before the acceleration or deceleration control routine (E).

If the value N1 is found to be less than the value N2 at the step S13, the flow branches off to an N1 up-counting process routine (I) and no acceleration, deceleration control is performed. Further, in this case, the counted value of responsivity counter N1 is incremented by one by the up-counting routine (I) every time this flow is executed once. Therefore, counted value of the responsivity counter N1 gradually increases.

Figure 4:
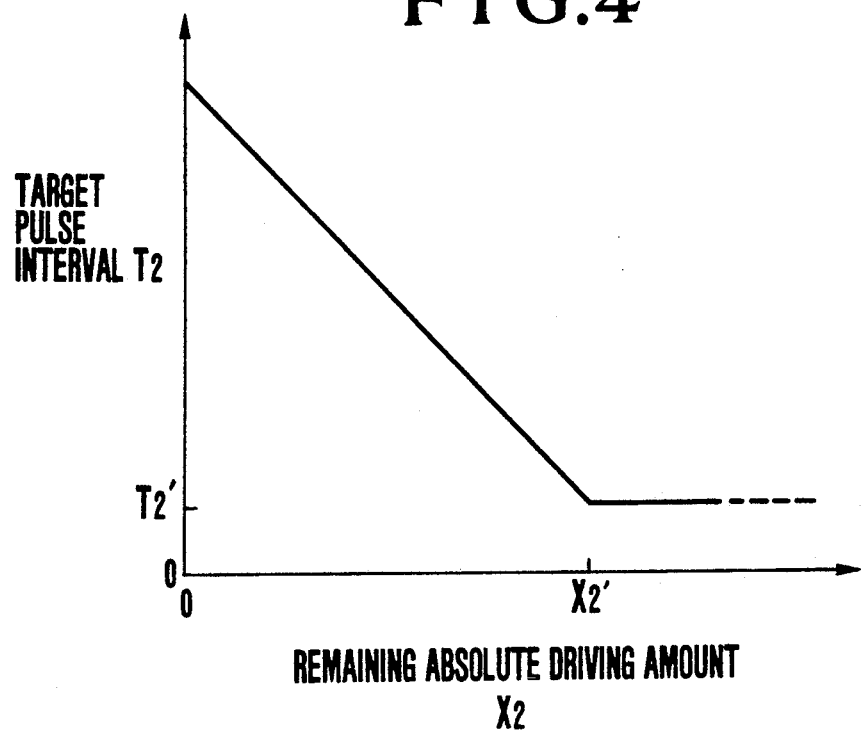
FIG. 4 is a chart showing the remainder of an absolute driving amount in relation to target pulse intervals.

(E) Target Pulse Interval Computing Routine: This routine is provided for setting the optimum rotating speed of the vibratory-wave motor 3. At a step S15: In the case of this embodiment, the rotating speed of the motor 3 is expressed by pulse interval time T. The target value T2 of the interval time T is obtained by using a function fs(X2) of the remaining absolute driving amount X2. The motor 3 is accelerated when this function fs(X2) is at a large value and is decelerated when it is at a small value. In order to obtain this characteristic, the function is arranged to be inversely proportional to the remaining absolute driving amount X2 as shown in FIG. 4. In the case of this embodiment, however, the target pulse intervals are arranged to be fixed when the remaining absolute driving amount X2 exceeds a given value. Referring to FIG. 4, a function which is at a value of fs(X2) =T2 is stored at a ROM included in the microcomputer. The target pulse interval T2 is determined by reading this function out from the ROM.

(F) Pulse Interval Comparing, Branching Routine: This routine determines conditions for having the actual rotating speed of the vibratory-wave motor 3 (detected through actual pulse interval) follow the rotating speed obtained by the target pulse interval set by the target pulse interval computing routine (E) described in the foregoing. At a step S16: The actual pulse interval T1 is compared with the target pulse interval T2. The flow then branches off to an applicable routine according to the result of comparison in the following manner: In the case of T2=T1, it is not necessary to accelerate or decelerate the rotating speed as the actual pulse interval coincides with the target pulse interval. If the result of comparison indicates T2>T1, the flow branches off to a deceleration instructing routine as the actual pulse interval is shorter than the target pulse interval. In the event of T2<T1, the flow branches off to an acceleration instructing routine as the actual pulse interval is longer than the target pulse interval.

Further, the actual pulse interval T1 is found by a T1 measuring subroutine (J) on the basis of a signal obtained from the pulse counter C1. In the case of this embodiment, as will be further described later, the T1 measuring subroutine (J) is executed by interruption while the main routine of FIG. 2 is being executed.

(G1) Acceleration Instructing Routine (Step S17): When the result of comparison made in the above stated pulse interval comparing, branching routine (F) indicates T2<T1, the flow comes to this routine (G1). If the rotating speed of the vibratory-wave motor 3 has not reached a designated highest possible level, the designated value of a driving frequency to be applied to the vibratory-wave motor 3 is decreased by one step (f=f−1) and it is transmitted to the register 2. If the rotating speed of the vibratory-wave motor 3 is at the designated highest possible level, this speed is maintained.

(G2) Deceleration Instructing Routine (Step S18): The flow comes to this routine in case that the result of comparison made by the pulse interval comparing, branching routine (F) indicates T2>T1. If the rotating speed of the vibratory-wave motor 3 has not reached a designated lowest possible level, the designated value of a driving frequency to be applied to the motor 3 is increased by one step (f=f+1) and it is transmitted to the register 2. If the rotating speed of the motor 3 is found to be at the designated lowest possible level, that value is maintained.

(H) Responsivity Flag F Setting Routine (Step S19): In case that the rotating speed of the vibratory-wave motor 3 has reached a target speed or that a decelerating action has been performed, the responsivity flag F is set at F=1 indicating a mode of "responsivity controlled." The embodiment is kept in this mode until the vibratory-wave motor 3 comes to a stop.

(I) Responsivity Counter N1 Up-counting Routine (Step S20): The counted value of the responsivity counter N1 is incremented by one.

(J) Pulse Interruption Processing Subroutine (Step S21): In this routine, the pulse time interval value of the pulse counter C1 detected from the lens system 4 is obtained and used as the value T1. This routine is repeatedly executed by interruption at intervals of a given period of time.

An example of operation of the invented lens system driving device provided with the electronic control device which performs control in the manner described with reference to the flow chart is as follows:

Position information required for causing the lens system 4 to turn round in the normal direction to a given degree is assumed to be obtained with the dial 7 operated. In response to this position information input, the switch E2 operates to allow the pulse counter C2 to count the given number of pulses. Following this, the main routine of the flow of FIG. 2 begins to be executed. First, at the steps S1 to S3 of the routine (A), the remaining relative driving amount X1 is detected. Since the remaining relative driving amount X1 is of a positive value, the flow of operation branches off to steps S7 and S8 of the routine (C) for the normal motor rotation mode.

The flag F is checked at the step S11. Since the flag F is initially set at 0, the flow comes to the step S14 to clear the responsivity counter N1. Then, at the step S15 in the routine (E). the target pulse interval T2 is counted as the function fs(X2) of the remaining absolute driving amount X2. In the case of this specific embodiment, this target pulse interval T2 is inversely proportional to the remaining absolute driving amount X2 as shown in FIG. 4.

Next, at the step S16 in the routine (F), the actual pulse interval value T1 which indicates the actual rotating speed of the vibratory-wave motor 3 and is obtained in a manner mentioned in the foregoing description of the step 21 of the subroutine (J) is compared with the above stated target pulse interval T2. In the initial stage of the rotation of the vibratory-wave motor 3, the value T1 is larger than the value T2. Therefore, the flow of operation branches off to the step S17 of the routine (G) for the acceleration instructing mode. The flow, therefore, branches off to the step S17 in the routine (G) for the acceleration instructing mode. At the step S17, the frequency set by the control circuit 10 is lowered by one step. Then, the flow returns through the routine (I) by which the counted value of the responsivity counter N1 is incremented.

With the above stated steps repeated, the frequency gradually decreases and the vibratory-wave motor 3 is accelerated to drive the lens system 4 at a higher speed. Then, at the step S16 in the routine (F), a state of T1=T2 comes to be detected. In this instance, the flow jumps from the step S16 of the routine (F) to the routine (H) (the step S19) by skipping the acceleration or deceleration routine. The flag F is set at 1 at the step S19 and the flow returns.

In the next cycle of execution, since the flag is found to be at F=1 at the step S11 in the routine (D), the responsivity comparison value N2 is computed at the step S12 through the function fa(X2) according to the remaining absolute driving amount X2. The comparison value N2 is in proportion to the remaining absolute driving amount X2 as shown in FIG. 3. Therefore, the value N2 is large if the remaining lens system driving distance to the target position thereof is long.

The computed responsivity comparison value N2 is compared with the counted value of the responsivity counter N1 at the step S13. The result of this comparison determines whether it is necessary or not to have the rotating speed of the lens system 4 adjusted to follow the target speed. More specifically, it is decided to be necessary in the case of N1≧N2 and flow comes to the step S15 in the routine (E), to the step S16 in the routine (F) or to the steps 17 and 18 in the routine (G) as applicable. At these steps, the rotation of the motor 3 is caused either to be accelerated or to be decelerated, or to be kept unchanged relative to the target pulse interval T2 obtained at that point of time. A signal representing the result of this action is supplied from the microcomputer 1 to the register 2. Follow-up control, i.e. speed control defined by the value T2, is performed over the vibratory-wave motor 3 according to the signal. In the event of N1<N2 which indicates nonarrival of time for follow-up speed control, the flow returns through the increment routine (I) for incrementing the counted value of the responsivity counter N1.

Further, in case that the follow-up control is performed according to the result of comparison N1≧N2, the flow comes to the step S14 of the routine (D) to clear the responsivity counter N1 for the purpose of newly determining the time point for next follow-up control on the basis of the remaining absolute driving amount X2.

After the above stated control has been carried out as necessary, when the lens system 4 reaches the target position thereof, the state of X1=0 is detected at the step S4 in the routine (B). The flow then branches off to the mode of bringing the motor to a stop. A stop signal is applied to the vibratory-wave motor 3. The control circuit 10 then becomes inoperative and the motor comes to a stop. At that moment, the flag F is set at 0 for a next lens system driving operation.

The above stated control arrangement presents two features, which are as follows: At the step S15 in the routine (E), the target pulse interval T2 is computed according (in inverse proportion) to the remaining absolute driving amount X2 currently obtained. This arrangement enables the embodiment to smoothly accomplish decelerating control by lowering the set rotating speed of the vibratory-wave motor 3 accordingly as the lens system 4 comes nearer to the target position thereof. Further, the actual pulse interval T1 obtained under the follow-up control relative to the target pulse interval T2 is determined according (in proportion) to the value of the remaining absolute driving amount X2 through the routines (D) and (I). That arrangement enables the embodiment to less frequently perform the follow-up control when the lens system 4 is relatively far away from the target position and is rotated faster and to more frequently perform the follow-up control when the lens system 4 comes nearer to the target position and is rotated slower. Therefore, the responsivity control can be accomplished in a manner advantageous for driving control over the lens system of the camera.

More specifically stated, in case that the remaining absolute driving amount X2 is still at a large value, the steps S11, S12, S13 and S20 are repeated. Then, since the responsivity comparison value N2 is large in this case, the steps S11, S12, S13, S14 and S15 to S20 are serially executed after the process of N1+1 of the step S20 has been repeated many times. Such being the arrangement, the speed control action of the steps S16, S17 and S18 is only infrequently executed to prevent the change of the rotation frequency of the motor 3 from giving a disagreeable feeling to the operator. When the remaining absolute driving amount X2 is small, the responsivity comparison value N2 is small. In that case, therefore, the speed control action of the steps S16 to S18 is more frequently executed accordingly as the remaining absolute driving amount X2 becomes smaller. Further, since the target pulse interval T2 is set at a large value at the step S15, the rotating speed of the motor 3 lowers to permit position control to be carried out with a high degree of accuracy.

The invention is not limited to the embodiment described in the foregoing. The arrangement of the embodiment may be variously modified. For example, the responsivity changing control may be arranged to be dependent stepwise upon the remaining driving amount up to the target position or to be dependent on the current rotating speed of the motor. The vibratory-wave motor is employed by way of example in the embodiment described. However, a motor of any other kind can be likewise controlled by the invented control arrangement as long as the motor has a sufficiently high degree of responsivity.

What is claimed is:

1. A control device for a moving body driven by a motor, comprising:

a detection circuit for detecting a position of said moving body relative to a target position;

a speed control circuit for adjusting a driving speed of the motor toward a target speed, said speed control circuit determining a control value for controlling the driving speed of the motor on the basis of speed information of the motor and the target speed;

a driving circuit for driving the motor at a speed corresponding to the control value determined by said speed control circuit;

a designating circuit arranged to render said speed control circuit operative at every interval of a settable time interval; and a set circuit for setting the settable time interval in correspondence to the position of said moving body relative to the target position detected by said detection circuit.

2. A control device according to claim 1, wherein said detection circuit detects a driving amount necessary for said moving body to move to said target position.

3. A control device according to claim 1, wherein said set circuit sets a shorter time interval as the driving amount detected by said detection circuit decreases.

4. A control device according to claim 2, wherein said speed control circuit includes a target speed set circuit for setting the target speed, said target speed set circuit setting a lower target speed as the driving amount detected by said detection circuit decreases.

5. A control device according to claim 1, wherein said speed control circuit includes a monitor circuit which detects the moving speed of the moving body to form the speed information of the motor, and a comparison circuit which compares the speed information from said monitor circuit with the target speed to output acceleration and deceleration information as the control value.

6. A control device according to claim 1, wherein said motor is a vibration type motor.

7. A control device according to claim 1, wherein said moving body is a focusing lens.

8. A control device for a moving body driven by a motor comprising:

a speed control circuit operable at a controllable interval for adjusting a driving speed of the motor toward a target speed, said speed control circuit determining a control value for controlling the driving speed of the motor on the basis of speed information of the motor monitored by a monitor circuit and on the basis of the target speed;

a driving circuit for driving the motor at a speed corresponding to the control value determined by said speed control circuit; and a control circuit for controlling the interval at which said speed control circuit adjusts the driving speed, said control circuit controlling the interval to vary accordance with a driving amount required for moving said moving body to a target position.

9. A control device according to claim 8, wherein the monitor circuit detects the moving speed of the moving body to form the speed information of the motor.

* * * * *

UNITED STATES PATENT AND TRADEMARK OFFICE
CERTIFICATE OF CORRECTION

PATENT NO. : 5,278,935
DATED : January 11, 1994
INVENTOR(S) : ETSURO FURUTSU

It is certified that error appears in the above-indentified patent and that said Letters Patent is hereby corrected as shown below:

Title page, item [57],

In the Abstract
"4,563,625 1/1986 Kornbrekke et al.....318/603" (second occurrence) should be deleted.

COLUMN 2:
line 15, "pronsonced" should read --pronounced--.

COLUMN 3:
line 58, "is" should read --are--.

COLUMN 4:
line 51, "position. Refer-" should read --position. ¶Refer---.
line 63, "1, including a driving" should read --1--;
line 64 should be deleted;
line 65, "action frequency controller and a designator," should be deleted; and
line 66, "microcomputer 1" should read --microcomputer 1, including a driving amount detector, a speed control action adjuster, an action frequency controller and a designator,--.

COLUMN 6:
line 67, "X2" should read --X2,--.

UNITED STATES PATENT AND TRADEMARK OFFICE
CERTIFICATE OF CORRECTION

PATENT NO. : 5,278,935
DATED : January 11, 1994
INVENTOR(S) : ETSURO FURUTSU

It is certified that error appears in the above-indentified patent and that said Letters Patent is hereby corrected as shown below:

<u>COLUMN 7</u>:
    line 2, "X2 (N2=fa(X2)αX2)." should read
--X2 (N2=fa(X2)=αX2).--.

<u>COLUMN 11</u>:
    line 9, "claim 1," should read --claim 2,--.

Signed and Sealed this

Twentieth Day of September, 1994

Attest:

BRUCE LEHMAN

*Attesting Officer*       *Commissioner of Patents and Trademarks*